United States Patent
Ostertag

(10) Patent No.: US 9,308,586 B2
(45) Date of Patent: Apr. 12, 2016

(54) PARING TOOL, METHOD FOR PRODUCING A CYLINDER UNIT AND LATHE

(75) Inventor: Alfred Ostertag, Celle (DE)

(73) Assignee: Ecoroll AG Werkzeugtechnik, Celle (DE)

( * ) Notice: Subject to any disclaimer, the term of this patent is extended or adjusted under 35 U.S.C. 154(b) by 10 days.

(21) Appl. No.: 14/237,798

(22) PCT Filed: Aug. 9, 2012

(86) PCT No.: PCT/DE2012/000802
§ 371 (c)(1),
(2), (4) Date: Feb. 7, 2014

(87) PCT Pub. No.: WO2013/020547
PCT Pub. Date: Feb. 14, 2013

(65) Prior Publication Data
US 2014/0216217 A1    Aug. 7, 2014

(30) Foreign Application Priority Data

Aug. 11, 2011   (DE) .......................... 10 2011 110 044

(51) Int. Cl.
*B23B 29/00*    (2006.01)
*B23B 27/10*    (2006.01)
*B23B 5/08*    (2006.01)
(Continued)

(52) U.S. Cl.
CPC ................. *B23B 5/08* (2013.01); *B23B 27/007* (2013.01); *B23B 27/10* (2013.01); *B23B 29/03457* (2013.01); *B23B 41/12* (2013.01); *B23B 43/02* (2013.01); *B23P 23/04* (2013.01); *B23B 2270/24* (2013.01); *Y10T 82/10* (2015.01); *Y10T 82/12* (2015.01); *Y10T 407/14* (2015.01)

(58) Field of Classification Search
CPC ..................... B23B 51/0493; B23B 2260/004; B23B 2260/0045
USPC ......................................... 82/1.11, 50; 407/11
See application file for complete search history.

(56) References Cited

U.S. PATENT DOCUMENTS 3,559,258 A * 2/1971 Gardner ....................... 29/90.01
3,973,319 A   8/1976 Klose
(Continued)

FOREIGN PATENT DOCUMENTS

CN          1095829 A    11/1994
CN        201267874 Y    7/2009
(Continued)

OTHER PUBLICATIONS

English translation of the Written Opinion.

*Primary Examiner* — Will Fridie, Jr.
(74) *Attorney, Agent, or Firm* — Whitham, Curtis, Christofferson & Cook, P.C.

(57) ABSTRACT

Method for producing a cylinder unit, with the steps: clamping the cylinder (44) to the workpiece clamping device (42) of a lathe (34), skiving the cylinder inner surface (62) of the cylinder (44) by means of a skiving tool (10), in particular by rotating the workpiece clamping device (42) such that a skived cylinder inner surface (62) is formed, smooth rolling the skived cylinder inner surface (62) by means of a smooth rolling tool (60), in particular by rotating the workpiece clamping device (42), and processing at least the front surface (64) of the cylinder unit, wherein the skiving, the smooth rolling and the processing at least of the front surface (64) are carried out in one setting.

17 Claims, 6 Drawing Sheets

Figure 1:
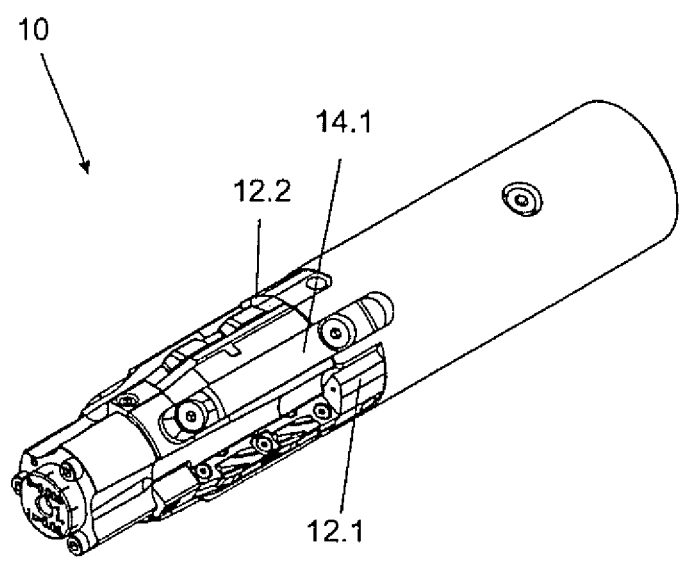

(51) Int. Cl.
  *B23B 41/12*  (2006.01)
  *B23B 43/02*  (2006.01)
  *B23B 29/034*  (2006.01)
  *B23P 23/04*  (2006.01)
  *B23B 27/00*  (2006.01)

(56) References Cited

U.S. PATENT DOCUMENTS

| | | | | |
|---|---|---|---|---|
| 4,184,794 | A * | 1/1980 | Henninghaus | 408/57 |
| 4,289,431 | A | 9/1981 | Berstein | |
| 4,573,381 | A * | 3/1986 | Hyatt et al. | 82/158 |
| 8,961,265 | B2 * | 2/2015 | Rauscher et al. | 451/6 |
| 2011/0214552 | A1 * | 9/2011 | Abe et al. | 83/663 |

FOREIGN PATENT DOCUMENTS

| | | |
|---|---|---|
| DE | 2346729 | 3/1975 |
| DE | 2723622 | 11/1978 |
| DE | 3116596 | 11/1982 |
| DE | 228757 | 10/1985 |
| DE | 228757 B1 | 10/1985 |
| DE | 3721610 | 1/1989 |
| DE | 3721610 A1 | 1/1989 |
| DE | 29512910 | 10/1995 |
| DE | 19521219 | 12/1996 |
| DE | 19613897 | 5/1997 |
| DE | 29918517 | 1/2000 |
| DE | 102005053155 | 5/2007 |
| EP | 1153683 | 11/2001 |
| EP | 1 782 903 | 11/2006 |
| GB | 748620 | 5/1956 |

* cited by examiner

PARING TOOL, METHOD FOR PRODUCING A CYLINDER UNIT AND LATHE

The invention concerns a method for producing a cylinder unit with the steps (a) clamping a cylinder to the workpiece clamping device of a lathe, (b) skiving the cylinder's inner surface by means of a skiving tool, in particular through the rotation of the workpiece clamping device, such that a skived cylinder inner surface is formed, (c) smooth rolling the skived cylinder inner surface by means of a rolling tool by rotation of the workpiece clamping device, and (d) processing at least the front surface of the cylinder unit.

According to a second aspect, the invention concerns a skiving tool, which features at least one cooling lubricant nozzle for delivering cooling lubricant, at least one cooling lubricant pipe, by means of which the cooling lubricant can be to the cooling lubricant nozzle, at least two skiving blades that are mounted in a floating manner and can be moved at least in a radial direction, and a steering cylinder, by means of which the skiving blades can be extended and retracted.

According to a third aspect, the invention concerns a lathe with (i) a spindle, (ii) a workpiece clamping device, which can be driven by the spindle and is programmed to clamp the cylinder unit, so that the cylinder unit can be turned about the longitudinal axis of the cylinder, and (iii) a slide for positioning the cutting tool at a given position relative to the workpiece clamping device, so that at least one face of the cylinder unit can be processed.

Cylinder units, which refer in particular to hydraulic and pneumatic cylinder units, are widely used in particular in the construction of vehicles. A piston is raised by supplying pressure fluid to the cylinder unit. Depending upon the maximum length variation of the cylinder unit, either short-stroke or long-stroke cylinders are referred to. In the construction of vehicles short-stroke cylinders are frequently used, for example as a part of power steering.

Short-stroke cylinders of this kind have hitherto been produced by first processing the ends of what later becomes the cylinder unit. During this so-called end processing, a flat front surface, as well as, if necessary, all shaped elements close to the front surface (e.g. thread, ring grooves, sealing seats or insertion chamfers) are for example produced by means of turning. The end processing is usually carried out using a turning or milling machine. In a subsequent step the end-processed blank is clamped in a deep drilling machine, by means of which the cylinder inner surface is produced, upon which the piston later runs. A disadvantage of the established manufacturing process is that the highest degree of accuracy can only be attained with difficulty.

The problem addressed by the invention is the improvement of accuracy and economy during the manufacturing of cylinder units, and of short-stroke cylinder units in particular.

The invention solves the problem with a generic procedure in which the skiving, the smooth rolling and the processing at least of the front surface, in particular of all shaped elements close to the front surface, are carried out in one setting, for example by turning or milling. According to a second aspect, the invention solves the problem with a generic skiving tool, with which the steering cylinder can be subjected to pressure via the cooling lubricant pipe. According to a third aspect, the invention solves the problem with a generic lathe, which features a skiving tool which is set up such that the cylinder inner surface of the cylinder unit can undergo the skiving process, and a smooth rolling tool for the smooth rolling of the cylinder inner surface, which is set up such that the cylinder inner surface of the cylinder unit can be machined by smooth rolling.

An advantage of the invention is that the end processing and the production of the cylinder inner surface in one setting lead to a higher degree of accuracy. During re-clamping losses in accuracy are to a large extent unavoidable, since adjustment errors occur. Processing in one setting has hitherto not been possible. Equally, deep drilling on a lathe was not possible, since deep drilling requires submersion cooling. However, lathes are not capable of supplying the necessary flow of cooling lubricant. At the same time it has neither been possible to carry out end processing with a deep drilling machine, since deep drilling machines do not feature slides which can provide a cutting tool with the necessary accuracy on the face of the cylinder unit being created.

A further advantage of the present invention is that it enables cylinder units to be manufactured with less effort. As such, re-clamping is no longer necessary, which is time consuming. Furthermore, it becomes unnecessary to retain two machines, since the machining of the cylinder can generally be completed on the lathe.

In the context of the present description, the cylinder refers in particular to the component which after processing becomes part of the cylinder unit. As such, before skiving the cylinder could be described as an unskived raw cylinder, and after skiving and before smooth rolling as an unrolled raw cylinder. After smooth rolling, the cylinder is completed in particular with a piston and a cylinder head for the cylinder unit.

It is possible, although not necessary, for the processing of the front surface of the cylinder unit to take place after smooth rolling and/or skiving. It is possible for the front surface as well as all shaped elements close to the front surface to first be processed by turning or milling and only afterwards for the skiving to take place. At least theoretically it is even conceivable that both processes could take place simultaneously with a combined tool. Likewise, it is possible to carry out the end processing after the skiving and smooth rolling of the cylinder surface.

In recognition of the feature that the skiving, the smooth rolling and the processing at least of the front surface are carried out by turning in one setting, it may be understood in particular that all shaped elements close to the front surface are processed. The term 'turning' refers to the cutting process.

The skiving of the cylinder inner surface is best carried out with an interior skiving tool, which features two or more extendible or retractable skiving blades in oscillating suspension. An interior skiving tool of this kind has the advantage that the resulting surface is not damaged by the skiving blades when the interior skiving tool is taken out.

The skiving of the cylinder inner surface of the cylinder is best achieved using a cooling lubricant. This can be for example a water-based cooling lubricant, an emulsion or a mineral oil based cooling lubricant.

According to a preferred embodiment, the skiving of the cylinder inner surface comprises the following steps: (b1) inserting a skiving tool into the cylinder interior of the cylinder, (b2) deploying at least two of the skiving tool's skiving blades by operating the steering cylinder, (b3) cutting the cylinder inner surface by means of the skiving blades, as well as removing resulting chips by means of the cooling lubricant, wherein (b4) the same cooling lubricant is used to operate the steering cylinder as is used to remove the chips.

In recognition of the feature that the same cooling lubricant is used to operate the steering cylinder and to remove the chips, it may be understood in particular that the cooling lubricant is conducted in a cooling lubricant circuit, such that during a theoretical process of infinite length the same cooling lubricant is used repeatedly. It is possible, although not necessary, for the operation of the steering cylinder to be carried out with a cooling lubricant that, due to the design of the skiving tool, may at some point come into contact with chips. In the operation of the steering cylinder it is in fact also possible to use a pressure fluid, which is subjected in turn to pressure from the cooling lubricant. As such, it is conceivable that a membrane or a dividing piston could be included, which separates the cooling lubricant from the pressure fluid, and by means of which the steering cylinder would be operated. The steering cylinder mentioned here naturally does not refer to the cylinder of the cylinder unit being produced. Instead of the term 'steering cylinder', the term 'tool-steering cylinder' could also be used.

It is advantageous when the cooling lubricant by means of which the steering cylinder is operated, or by means of which pressure fluid is subjected to pressure during the operation of the steering cylinder, is taken from the same pipe as where the cooling lubricant is transported to the cooling lubricant nozzle, out of which the cooling lubricant can be released in such a way that resulting chips can be removed during the skiving process. In this case, in a process of theoretically arbitrary length there is an assumed volume of cooling lubricant which has operated the steering cylinder at least once and which has also removed chips.

According to a preferred embodiment, the skiving of the cylinder inner surface comprises the removal of chips by means of cooling lubricant, wherein the cooling lubricant is released by at least one cooling lubricant nozzle and directly before the withdrawal of the cooling lubricant nozzle is at a pressure of at least 4 MPa. This level of pressure is usually necessary in order to be able to reliably remove the chips resulting from skiving with the small amount of cooling lubricant available on lathes. If the removal of the chips cannot be guaranteed, there is a risk of a so-called chip back-up, which would overburden the tool and the machine.

During the skiving of the cylinder inner surface, the cooling lubricant flow rate, by means of which the chips are removed, best amounts to a maximum of 100 liters per minute, in particular a maximum of 50 liters per minute. Traditionally, the cylinder inner surface is produced by deep drilling, which requires submersion cooling, namely cooling at low pressure and with a high flow rate. With the skiving process, lower cooling lubricant flow rates are attainable, provided that the pressure being worked with is higher. However, lathes are not generally capable of supplying correspondingly high cooling lubricant pressures. This applies in particular to existing lathes, with which the large majority of cylinder units are produced.

The cylinder inner surface preferably has a maximum depth of 1.5 meter. Up to this depth, the process according to invention has the greatest advantages with regards to deep drilling.

The lathe according to the invention preferably possesses one or more cutting tools such as turning tools and/or milling tools. As such, the front and preferably also a side of the cylinder unit can be processed with a high degree of accuracy.

Preferably, it is possible to use the skiving tool independently of the smooth rolling tool. Whilst according to the invention a combined skiving and smooth rolling tool can be used, such tools are complex. Since the processing of the cylinder unit can be completed in one setting, it is both possible and advantageous to design the skiving tool to be used independently of the smooth rolling tool, so that simpler and therefore more robust tools are used.

According to a preferred embodiment, the skiving tool features at least one cooling lubricant nozzle for releasing cooling lubricant, and/or at least two hydraulically operated skiving blades which can be moved at least in a radial direction.

According to a preferred embodiment, the skiving tool comprises a unit for the raising of the cooling lubricant pressure, which features a cooling lubricant inlet which connects to the lathe's cooling lubricant port, a pump for raising the cooling lubricant pressure and a cooling lubricant outlet, which is connected to the cooling lubricant pipe. The majority of cylinder units have hitherto been produced on lathes whose cooling lubricant supply is not dimensioned with the sufficient strength to ensure a reliable cutting process. Since in the context of the invention the chips can be removed by a cooling lubricant jet with high pressure and a lower flow, an existing lathe can be retrofitted so that it can process cylinder units in just one clamped position, in that it includes the unit for raising the cooling lubricant pressure. Together with the unit for raising the pressure of the cooling lubricant, the skiving tool constitutes a retrofit kit, so that lathes can be retrofitted for the production of cylinder units in one setting.

The cooling lubricant is then placed under pressure by at least one pump. Under favourable conditions, two pumps can be used in combination with one another, i.e. firstly the cooling lubricant pump belonging to the lathe and then the pump belonging to the unit for increasing the pressure of the cooling lubricant.

Figure 2:
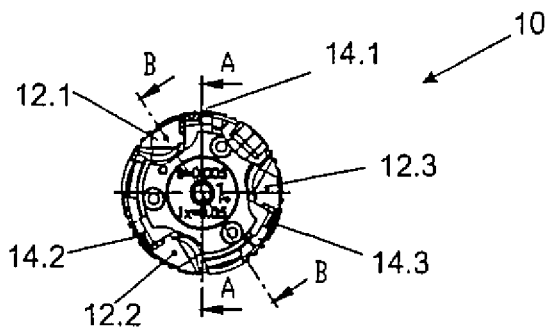
Figure 3:
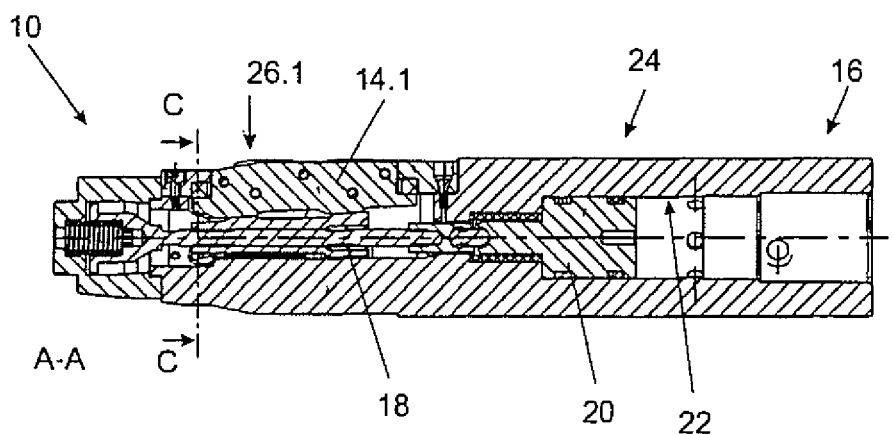
Figure 4:
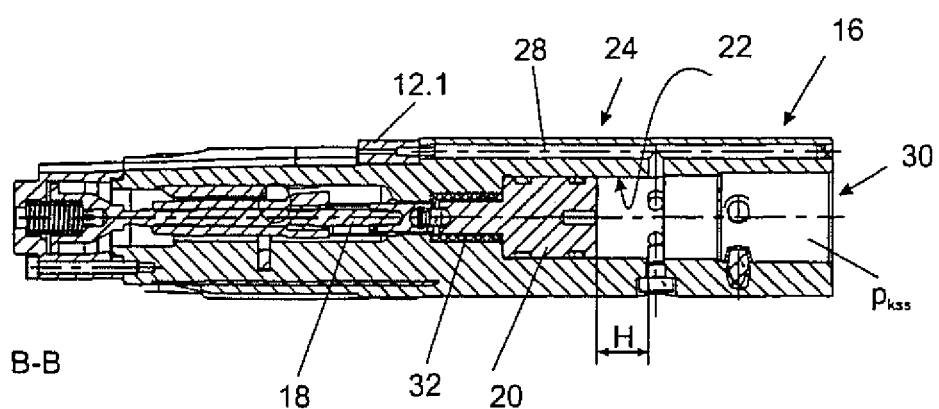
Figure 5:
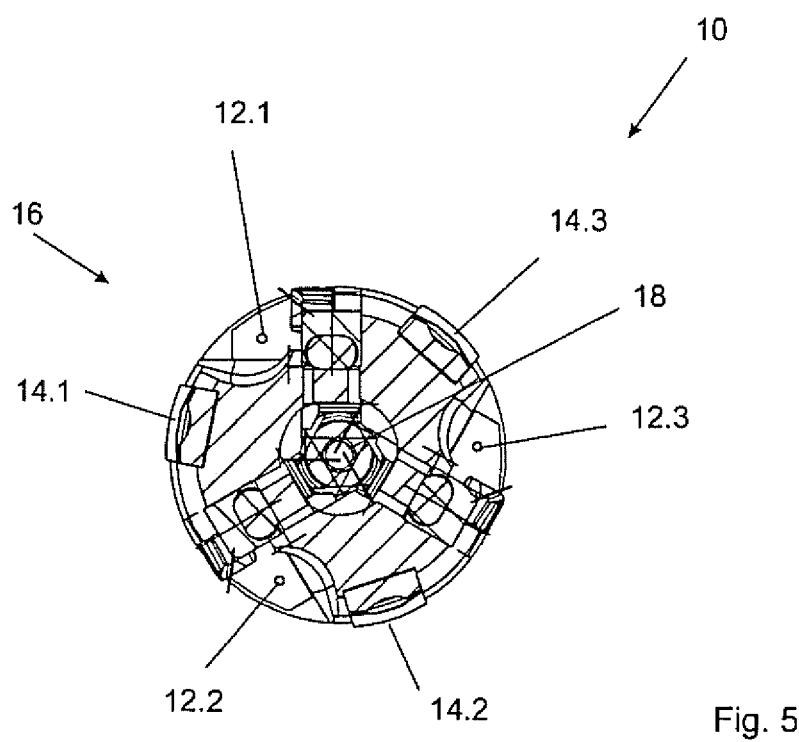
Figure 6:
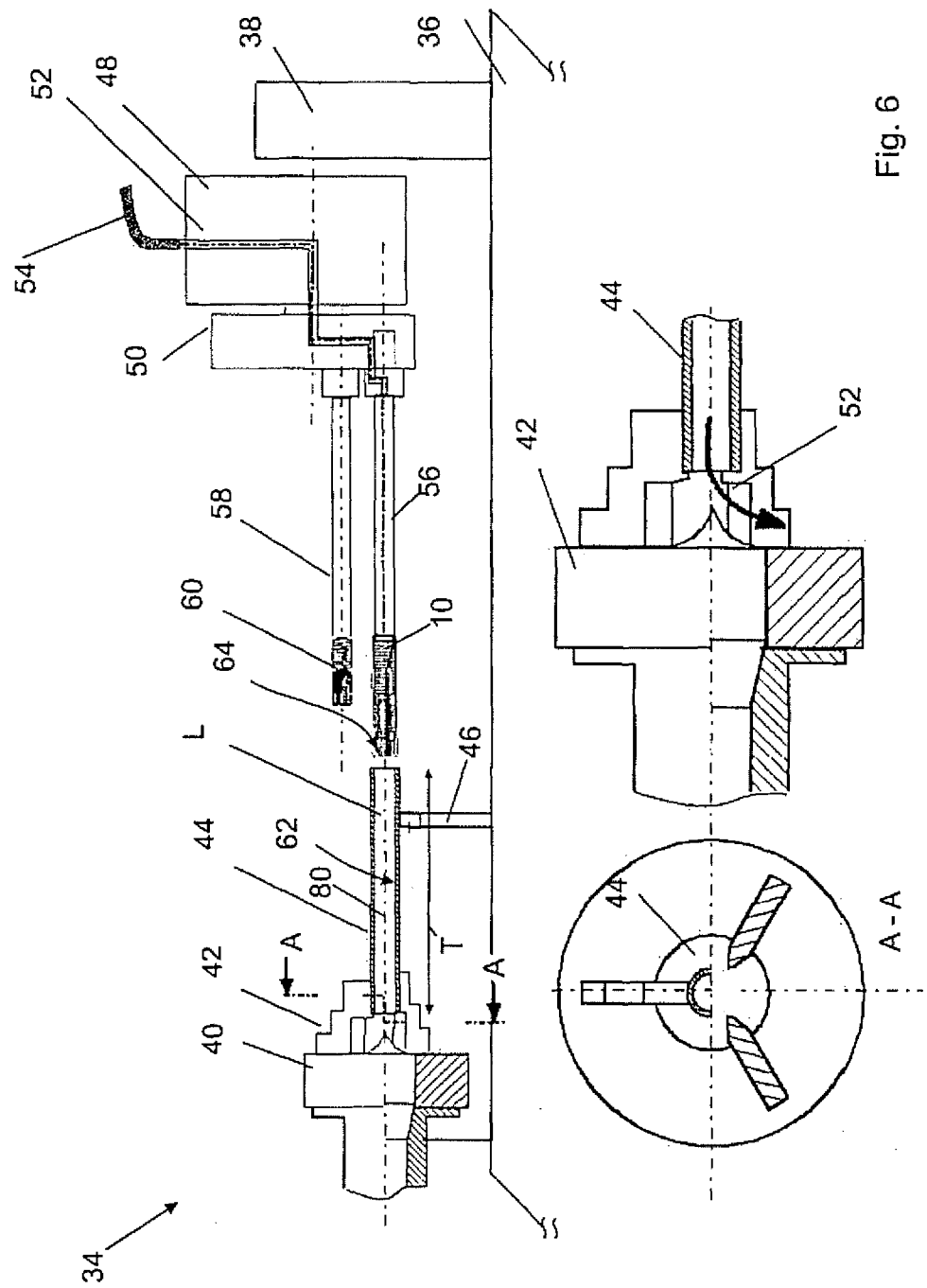
Figure 7:
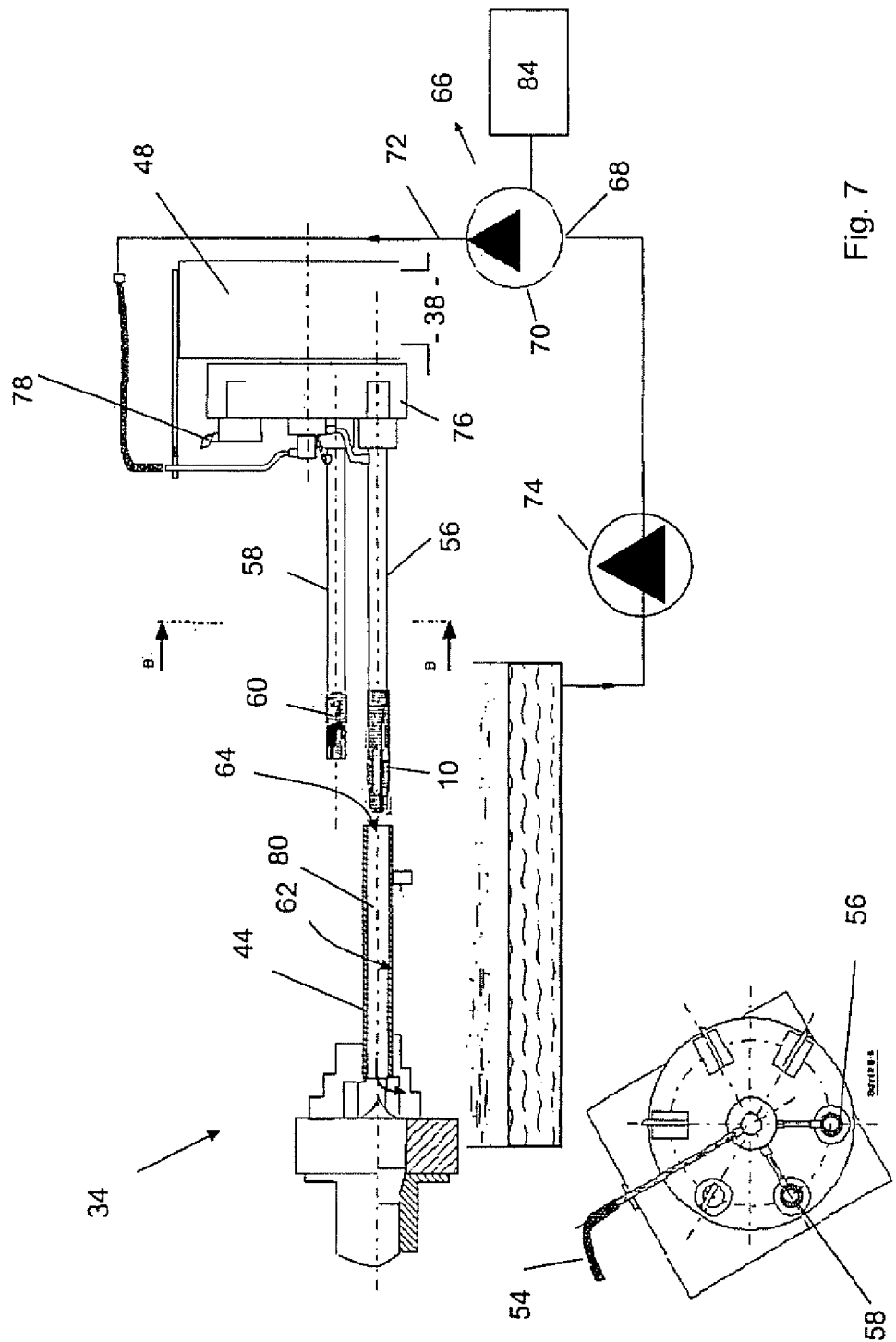
Figure 8:
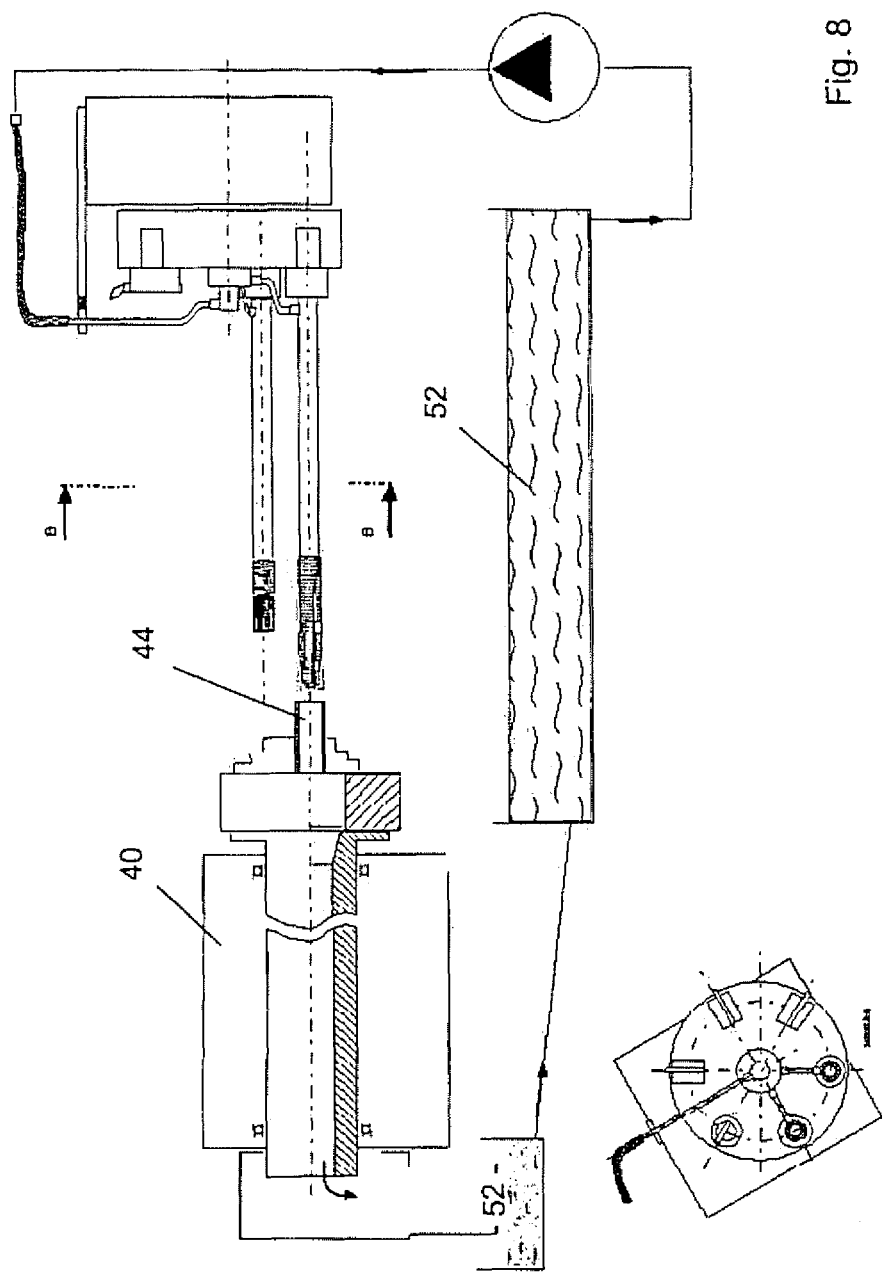

In the following the invention is further explained with reference to attached drawings. What is shown is:

FIG. 1 a perspective view of the skiving tool according to the invention,

FIG. 2 a front view of the skiving tool in accordance with FIG. 1,

FIG. 3 an A-A sectional view in accordance with FIG. 2,

FIG. 4 a B-B sectional view in accordance with FIG. 2,

FIG. 5 a cross section along the line C-C in accordance with FIG. 3,

FIG. 6 a schematic view of the lathe according to the invention,

FIG. 7 a schematic view of a second embodiment of a lathe according to the invention and FIG. 8 a schematic view of a third embodiment of a lathe according to the invention.

FIG. 1 shows the skiving tool 10 according to the invention, which features a first cooling lubricant nozzle 12.1 and a second cooling lubricant nozzle 12.2, as well as a further cooling lubricant nozzle not shown in FIG. 1. The skiving tool 10 additionally possesses three skiving blades, of which skiving blade 14.1 is shown. The skiving blade 14 (references without a number after them indicate all generic objects) is in oscillating suspension at base body 16, and can be moved in a radial direction, i.e. outwards and inwards towards the centre.

The cooling lubricant nozzles 12 are designed such that they release a jet of cooling lubricant, which runs at least predominantly in an axial direction. The cooling lubricant nozzles 12 are additionally set up such that they are directed into the chip space of the skiving blade, which runs behind relative to the turning direction. The chips produced by the skiving blades are thus captured by the jet of cooling lubricant and carried away from the skiving tool 10.

FIG. 2 shows a front view of the skiving tool 10. It should be noted that the skiving tool 10 has triple symmetry. The skiving blades 14.1, 14.2, 14.3 are each offset approximately 120° from one another. The base body 16 is cylindrical, wherein the skiving blades 14 can be placed in a first position, in which they are situated within a phantom hull around the base body 16, and in a second position, in which they protrude beyond this phantom hull.

FIG. 3 shows a longitudinal cross section of the skiving tool 10 in accordance with the sectional view A-A in accordance with FIG. 2. It should be noted that the skiving blade 14.1 is set up such that it can be operated via a switching cone 18. The switching cone 18 is moved by the piston 20, which is within the cylinder bore and together with this constitutes the steering cylinder 24.

FIG. 3 shows the steering cylinder 24 and with it the skiving blade 14.1 in its working position, in which the edge 26.1 of the skiving blade 14 protrudes over the phantom hull cylinder of the base body 16. In this situation, the switching cone 18 pushes the skiving blade 14.1 outwards against the power of a spring which is not drawn in FIG. 3.

FIG. 4 shows a longitudinal cross section along the line B-B in accordance with FIG. 2. It should be noted that the cooling lubricant nozzle 12.1 can be supplied with cooling lubricant via the cooling lubricant pipe 28. The cooling lubricant arrives in the cooling lubricant pipe 28 through the cooling lubricant supply 30. The cooling lubricant pipe 28 is connected to the cylinder bore 22, so that if an increased cooling lubricant pressure $p_{KSS}$ is applied to the cooling lubricant supply 30, the axial force is in turn increased, which the piston 20 applies to the switching cone 18.

FIG. 2 shows stroke H, along which the piston 20 enters into the cylinder bore 22 if the cooling lubricant pressure $p_{KSS}$ falls beneath the minimum pressure $p_{min}$. In this case a spring 32 pushes the piston 20 back, so that the switching cone 18 is relieved and the skiving blade (see. FIG. 3) is pushed back into the resting position by the springs (here not drawn), namely it is then situated within the phantom cylinder shell around the base body.

The cooling lubricant pipe 28 supplies not only the cooling lubricant nozzle 12.1 with cooling lubricant, but also the cooling lubricant nozzles 12.2 and 12.3 not included in FIGS. 3 and 4.

FIG. 5 shows a cross section along the section C-C in accordance with FIG. 3, in which the skiving blades 14 are set up for use, protruding out of the cylinder shell around the base body 16.

FIG. 6 shows a schematic view of a lathe 34 according to the invention, with a machine bed 36 as indicated, a slide 38, which can be automatically positioned relative to the machine bed, and a spindle 40. A workpiece clamping device 42 is attached to the spindle 40, by means of which a cylinder 44 can be clamped. The cylinder 44 could also be referred to as the raw cylinder unit. The lathe 34 additionally possesses a steady rest 46, with which the cylinder 44 is supported as it rotates about its longitudinal axis L.

The lathe 34 comprises, according to a preferred embodiment of the invention, a turret 48, which comprises a revolving turret disk 50. The turret 48 and the turret disk 50 are configured such that cooling lubricant 52 can be delivered by a supply pipe 54 both to a first drill rod 56 and to a second drill rod 58. Both the first drill rod 56 and the second drill rod 58 can be aligned by turning the turret disk 50 coaxially to the longitudinal axis of the machine, which coincides with the longitudinal axis of cylinder L in FIG. 6. The skiving tool 10 is attached to the first drill rod 56, a smooth rolling tool 60 is attached to the second drill rod 58.

According to the invention, the method is carried out by first attaching the cylinder 44 to the spindle 40, securely so that it cannot be turned, by means of the workpiece clamping device 42. Afterwards the cylinder inner surface 62 of the cylinder 44 is processed by rotating the workpiece clamping device 42 by means of the skiving tool 10. A skived cylinder inner surface is formed which is subsequently smooth rolled by means of the smooth rolling tool 60. In addition, the turret disk 50 is turned and the skiving tool 10 is then disengaged and the smooth rolling tool 60 is engaged.

In the following or the preceding step the cutting of the front surface 64 of the cylinder 44 is completed, for example with the turning tool 78. In subsequent steps a piston is inserted into the cylinder 44 and covered with a cylinder head, such that a cylinder unit is produced.

The bottom left part of FIG. 6 shows a sectional view with respect to the A-A intersection shown at the top. It should be noted that the opening of the cylinder 44 that faces away from the skiving tool 10 leads to an open cavity of the workpiece clamping device 42, such that the cooling lubricant can escape. This situation is shown in the bottom right part. The cooling lubricant 52 leaves the cylinder 44 at the end which faces away from the skiving tool 10 and which is adjacent to the workpiece clamping device 42.

FIG. 7 shows an alternative embodiment of the lathe 34 according to the invention and the skiving tool 10 according to the invention, which features a unit for increasing the pressure of the cooling lubricant 66. This contains a cooling lubricant inlet 68, a pump 70 and a cooling lubricant outlet 72, which is connected to the cooling lubricant pipe 28 (see FIG. 4). The cooling lubricant inlet 68 is supplied with cooling lubricant by the cooling lubricant pump 74 belonging to the lathe 34, which is not usually capable of supplying the necessary high pressures.

FIG. 7 additionally shows a selective rotating feedthrough 76, which is included in the favoured version of the lathe 34 according to the invention, and which is attached to the turret 48 so that it can rotate. The rotating feedthrough 76 is configured such that it is only ever the active drill rod, in the present case the first drill rod 56, that can be subjected to the cooling lubricant pressure $p_{KSS}$, and not the inactive drill rod, in the present case drill rod 58. The bottom part shows a top view with respect to section B-B.

FIG. 7 additionally shows the cutting tool 78, in the present case a rotating chisel, which, by means of the slide 38 to which the turret 48 is attached, can be positioned in such a way that the front surface 64 of the cylinder 44 can be turned on a level plane.

When carrying out the method according to the invention, the skiving device 10 is inserted into the cylinder interior 80 of the cylinder 44. After this, the cooling lubricant pressure $p_{KSS}$ is increased, such that the skiving blades 14 (see. FIGS. 1 to 4) are extended. The cylinder inner surface 62 is then produced by means of skiving. The chips are taken away by means of the cooling lubricant and enter into the cooling lubricant container 82.

After the completion of the skiving process the cooling lubricant pressure $p_{KSS}$ is decreased, such that the skiving blades disengage and enter into the rest position. The skiving tool 10 is then removed and the smooth rolling tool 60 is inserted into the cylinder interior 80. The cylinder inner surface 62 is then smooth rolled.

According to the invention, and as schematically shown in FIG. 7, the lathe 34 comprises a control unit 84, which is configured to carry out the method according to the invention, in particular to drive the slide 38, such that it inserts the skiving tool 10 into the cylinder interior 80, to drive the spindle 40, such that the cylinder 44 is turned, and to increase the cooling lubricant pressure $p_{KSS}$, such that the skiving blades 14 are extended. The control unit 84 is additionally configured to subsequently move the slide 38 such that the skiving tool 10 produces the cylinder inner surface 62, and to subsequently lower the cooling lubricant pressure $p_{KSS}$, such that the skiving blades 14 are retracted. Afterwards the turret 48 is switched to the smooth rolling tool and the cooling lubricant pressure is set to the appropriate cooling lubricant pressure for the smooth rolling tool. The slide 38 is subsequently positioned such that the cutting tool 78 creates the desired geometry on the front surface of the workpiece.

FIG. 8 shows a variation, namely that the cylinder 44 runs through the spindle 40 during processing, such that the cooling lubricant is drained off in the interior of the cylinder 44 and is caught behind the spindle.

| List of reference numbers | |
|---|---|
| 10 | Skiving tool |
| 12 | Cooling lubricant nozzle |
| 14 | Skiving blade |
| 16 | Base body |
| 18 | Switching cone |
| 20 | Piston |
| 22 | Cylinder bore |
| 24 | Steering cylinder |
| 26 | Edge |
| 28 | Cooling lubricant pipe |
| 30 | Cooling lubricant supply |
| 32 | Spring |
| 34 | Lathe |
| 36 | Machine bed |
| 38 | Slide |
| 40 | Spindle |
| 42 | Workpiece clamping device |
| 44 | Raw cylinder unit, Cylinder |
| 46 | Steady rest |
| 48 | Turret |
| 50 | Turret disk |
| 52 | Cooling lubricant |
| 54 | Supply pipe |
| 56 | First drill rod |
| 58 | Second drill rod |
| 60 | Smooth rolling tool |
| 62 | Cylinder inner surface |
| 64 | Front surface |
| 66 | Unit for increasing the pressure of the cooling lubricant |
| 68 | Cooling lubricant inlet |
| 70 | Pump |
| 72 | Cooling lubricant outlet |
| 74 | Cooling lubricant pump |
| 76 | Rotating feedthrough |
| 78 | Cutting tool |
| 80 | Cylinder interior |
| 82 | Cooling lubricant container |
| 84 | Control unit |
| $p_{KSS}$ | Cooling lubricant pressure |
| H | Stroke |
| $p_{min}$ | Minimum pressure |
| L | Longitudinal axis of cylinder |

The invention claimed is:

1. A method for producing a cylinder unit, comprising the steps:
   clamping a cylinder to a workpiece clamping device of a lathe,
   skiving a cylinder inner surface of the cylinder by means of a skiving tool, the step of skiving including actuating the skiving tool and rotating the workpiece clamping device, such that a skived cylinder inner surface is formed,
   smooth rolling the skived cylinder inner surface by means of a rolling tool, the step of smooth rolling including rotating the workpiece clamping device, and
   processing at least a front surface of the cylinder,
   wherein the steps of skiving, smooth rolling, and processing at least the front surface are carried out in one setting, and
   wherein the same cooling lubricant actuates the skiving tool and removes chips resulting from the step of skiving.

2. The method according to claim 1, wherein the step of skiving the cylinder inner surface further comprises the following steps:
   inserting a skiving tool into a cylinder interior of the cylinder,
   extending at least two skiving blades by operating a steering cylinder,
   cutting the cylinder inner surface by means of the skiving blades, as well as removing the resulting chips by means of the cooling lubricant.

3. A method for producing a cylinder unit, comprising the steps:
   clamping a cylinder to a workpiece clamping device of a lathe;
   skiving a cylinder inner surface of the cylinder by means of a skiving tool, the step of skiving including rotating the workpiece clamping device, such that a skived cylinder inner surface is formed;
   smooth rolling the skived cylinder inner surface by means of a rolling tool, the step of smooth rolling including rotating the workpiece clamping device; and
   processing at least a front surface of the cylinder,
   wherein the steps of skiving, smooth rolling, and processing at least the front surface are carried out in one setting,
   wherein the step of skiving the cylinder inner surface comprises removing chips by means of a cooling lubricant, and
   wherein the cooling lubricant is released by at least one cooling lubricant nozzle and is under a pressure ($p_{KSS}$) of at least 4 MPa.

4. A method for producing a cylinder unit, comprising the steps:
   clamping a cylinder to a workpiece clamping device of a lathe;
   skiving a cylinder inner surface of the cylinder by means of a skiving tool, the step of skiving including rotating the workpiece clamping device, such that a skived cylinder inner surface is formed;
   smooth rolling the skived cylinder inner surface by means of a rolling tool, the step of smooth rolling including rotating the workpiece clamping device; and
   processing at least a front surface of the cylinder,
   wherein the steps of skiving, smooth rolling, and processing at least the front surface are carried out in one setting, and
   wherein a cooling lubricant flow rate amounts to a maximum of 100 liters per minute.

5. A lathe, comprising
   (i) a spindle;
   (ii) a workpiece clamping device, which is driveable by the spindle and is configured to clamp a cylinder unit such that the cylinder unit can be turned about the longitudinal axis of the cylinder;
   (ii) a slide for positioning a cutting tool in a pre-determinable position relative to the workpiece clamping device, such that the face of the cylinder unit can be processed;
   (iv) a skiving tool, the skiving tool including
      at least one cooling lubricant nozzle for releasing cooling lubricant,
      at least one cooling lubricant pipe, by means of which the cooling lubricant can be taken to the cooling lubricant nozzle, at least two skiving blades that are mounted in a floating manner and that are moveable at least in a radial direction, and a steering cylinder by means of which the skiving blades are extendable and retractable, wherein the steering cylinder is subjectable to pressure via the cooling lubricant pipe; and (v) a smooth rolling tool for smooth rolling the cylinder inner surface, the smooth rolling tool being set up such that the cylinder inner surface of the cylinder unit can be processed by smooth rolling.

6. The lathe according to claim 5, wherein the skiving tool is moveable independently of the smooth rolling tool.

7. The lathe according to claim 5, further comprising a cooling lubricant supply unit set up to release the cooling lubricant with a pressure ($p_{KSS}$) of at least 4 MPa.

8. The lathe according to claim 5, wherein the skiving tool and/or the smooth rolling tool are arranged on a tool switching device.

9. The lathe according to claim 8, wherein the tool switching device is a turret.

10. The method according to claim 4, wherein the cooling lubricant flow rate amounts to a maximum of 50 liters per minute.

11. The method according to claim 1, wherein the step of processing at least a front surface precedes the steps of skiving and smooth rolling.

12. The method according to claim 1, wherein the step of processing at least a front surface follows the steps of skiving and smooth rolling.

13. The method according to claim 1, wherein actuating the skiving tool includes operating a steering cylinder to perform one or more of extending and retracting at least two skiving blades.

14. The method according to claim 13, wherein operating the steering cylinder includes extending the at least two skiving blades from a first position situated within a phantom hull to a second position protruding beyond the phantom hull.

15. The method according to claim 1, wherein in the step of skiving, cooling lubricant is transported through a cooling lubricant pipe extending through a base body of the skiving tool and leading to a cooling lubricant nozzle.

16. The method according to claim 15, wherein in the step of skiving, the cooling lubricant is transported through the cooling lubricant pipe to the cooling lubricant nozzle at a pressure of at least 4 MPa and flow rate of 100 liters per minute or less.

17. The method according to claim 1, wherein the one setting in which the steps of skiving, smooth rolling, and processing at least the front surface are carried out is in a single lathe.

* * * * *